United States Patent
Nagamatsu et al.

[11] Patent Number: 6,042,783
[45] Date of Patent: Mar. 28, 2000

[54] HOLLOW YARN MEMBRANE USED FOR BLOOD PURIFICATION AND BLOOD PURIFIER

[75] Inventors: Hiroshi Nagamatsu, Kobe; Satoshi Takata, Takasago, both of Japan

[73] Assignee: Kaneka Corporation, Osaka, Japan

[21] Appl. No.: 08/973,243

[22] PCT Filed: Mar. 21, 1997

[86] PCT No.: PCT/JP97/00924

§ 371 Date: Feb. 3, 1998

§ 102(e) Date: Feb. 3, 1998

[87] PCT Pub. No.: WO97/34687

PCT Pub. Date: Sep. 25, 1997

[30] Foreign Application Priority Data

Mar. 21, 1996 [JP] Japan .................................. 8-093266
Mar. 21, 1996 [JP] Japan .................................. 8-093267

[51] Int. Cl.[7] .................................................. A61M 1/14
[52] U.S. Cl. .............................................................. 422/44
[58] Field of Search ...................... 604/4, 5, 6; 210/650, 210/645–6, 321.8; 422/46, 48, 44; 428/398, 308.4

[56] References Cited

U.S. PATENT DOCUMENTS

| | | | |
|---|---|---|---|
| 4,822,489 | 4/1989 | Nohmi et al. | 210/500.3 |
| 4,874,522 | 10/1989 | Okamoto et al. | 210/645 |
| 4,906,375 | 3/1990 | Heilmann | 210/500.23 |
| 4,940,541 | 7/1990 | Aoyagi | 210/321.8 |
| 5,221,474 | 6/1993 | Yokono et al. | 210/436 |
| 5,232,601 | 8/1993 | Chu et al. | 210/646 |
| 5,286,449 | 2/1994 | Kuroda et al. | 422/48 |
| 5,436,068 | 7/1995 | Kobayashi et al. | 428/308.4 |

FOREIGN PATENT DOCUMENTS

| | | | |
|---|---|---|---|
| 56-118445 | 9/1981 | Japan | C08L 33/02 |
| 60-222112 | 11/1985 | Japan | B01D 13/00 |
| 61-113460 | 5/1986 | Japan | A61M 1/18 |
| 61/232860 | 10/1986 | Japan | A61M 1/34 |
| 62-041314 | 2/1987 | Japan | D01F 6/76 |
| 62-221362 | 9/1987 | Japan | A61M 1/18 |
| 63-278503 | 11/1988 | Japan | B01D 13/00 |
| 63-56802 | 11/1988 | Japan | B01D 13/00 |
| 1-182362 | 7/1989 | Japan | C01L 71/02 |
| 3-251233 | 10/1990 | Japan | B01D 71/68 |
| 3-258330 | 11/1991 | Japan | B01D 69/08 |

*Primary Examiner*—Corrine McDermott
*Assistant Examiner*—Cheryl L. Huseman
*Attorney, Agent, or Firm*—Pollock, Vande Sande & Amernick

[57] ABSTRACT

A polysulfone hollow fiber membrane for blood purification which has no danger that any component of the membrane dissolves out, and which can be used suitably or hemodialysis and blood filtration and remove selectively and efficiently low-molecular-weight proteins having molecular weight of 10,000 to 30,000 contained in blood, as well as a blood purifier which can be used suitably as a hemodialyzer, a filter for hemodiafiltration and a blood filter are provided. The hollow fiber membrane comprises a polysulfone resin, wherein there are slit-shaped micropores having an average width of 0.02 to 0.15 $\mu$m on the inner surface thereof; there are micropores having an average pore size of 0.1 to 1 $\mu$m on the outer surface thereof; the inside thereof has a sponge-like structure; there are no large voids having a diameter of more than 10 $\mu$m on the inner and outer surface thereof and inside the membrane; water permeability thereof is 400 to 2,500 ml/m$^2$·hr·mmHg; and a permeation rato for the total proteins is 1% or less. The blood puifier contains the hollow fiber membrane put into a cylindrical housing which is equipped with a blood inlet and a blood outlet, and either a dialysate solution inlet and a dialysate solution outlet or a filtrate outlet.

30 Claims, 4 Drawing Sheets

6,042,783

HOLLOW YARN MEMBRANE USED FOR BLOOD PURIFICATION AND BLOOD PURIFIER

TECHNICAL FIELD

The present invention relates to a hollow fiber membrane for blood purification comprising a polysulfone resin and a blood purifier using the same.

BACKGROUND ART

Renal insufficiency originating from functional disorders of kindney is a disease directly related to life because it brings abnormal increases of blood serum urea nitrogen (BUN), blood creatinine, blood methylguanidine and the like and causes various affections. Various artificial kidneys are currently used as conservative treatment for renal insufficiency, and major kinds of these artificial kidneys can remove body wastes such as urea from blood of patients by performing hemodialysis or blood filtration for the patients with using a module comprising a hollow fiber membrane.

Materials for such a hollow fiber membrane used are polymers such as cellulose, cellulose acetate, polyamide, polyacrylonitrile, ethylene-vinylalcohol copolymer, poly (methyl methacrylate) and polysulfone. Among these, hollow fiber membranes comprising a polysulfone resin are superior in heat resistance, chemical resistance, mechanical strength, biological compatibility and the like, and they have attracted attention recently.

With recent progress of artificial dialysis treatment technologies, patients taking artificial dialysis for more than 10 years have increased in number, and much expression of complications such as anemia, bone/joint abnormality and neuropathy has been found in these patients.

Causal substances of these symptoms attracting attention are low-molecular-weight proteins having molecular weight of 10,000 to 30,000 or medium-molecular-weight substances having molecular weight of several thousands to tens of thousands, which are contained in blood. An example of a low molecular weight protein is β2-microglobulin (molecular weight of 11,800) which is a causal substance of a carpal syndrome. Thus, a hollow fiber membrane for artificial dialysis has been required to have such selective separability that low-molecular-weight proteins having molecular weight of 10,000 to 30,000 easily permeate but a useful protein, albumin (molecular weight of 69,000) does not permeate, as well as removal performance for low-molecular-weight substances such as urea and creatinine.

As a hollow fiber membrane for blood purification comprising a polysulfone resin, a hollow fiber membrane containing a hydrophilic polymer such as poly(vinyl pyrrolidone) and poly(ethylene glycol) is disclosed in Japanese Kokoku Publication J5-54373 and Japanese Kokai Publication J6-296686. It is obtained by preparing a membrane after mixing a hydrophilic polymer with a polysulfone resin in a form of spinning solution not forming a membrane.

Additionally, Japanese Kokai Publication J6-238139 discloses a technology for obtaining such a polysulfone hollow fiber membrane for blood purification containing a hydrophilic polymer by preparing a polysulfone hollow fiber membrane for blood purification, assembling them into a module, and then introducing a hydrophilic polymer solution into the inside of the said hollow fiber to coat the inner side of the hollow fiber membrane with the said hydrophilic polymer.

However, these hollow fiber membranes for blood purification have some problems in safety because there is a possibility that a hydrophilic polymer may be dissolving out in clinical applications. In addition, membrane performance may change with time by dissolution of a hydrophilic polymer into a module-filling liquid after assembling a module. Thus technologies disclosed in Japanese Kokai Publication J6-238139 and Japanese Kokai Publication J6-339620 have tried to prevent this dissolution by crosslinking poly(vinyl pyrrolidone) with the radiation treatment or heat-treatment, but the results are not satisfactory.

Moreover, these membranes have such drawbacks that mechanical strength of a membrane itself in the hollow fiber membrane for blood purification may be lowered and that water permeability may also decrease when content of a hydrophilic polymer in the hollow fiber membrane for blood purification increases. Furthermore, there are also such a drawback that special equipment for storage is necessary because these membranes absorb moisture in air during storage after preparing them.

In Japanese Kokai Publication J61-232860 and Japanese Kokai Publication J63-105770, a polysulfone hollow fiber membrane not containing a hydrophilic polymer is disclosed, but it can be used only as a plasma separating membrane to filtrate and separate plasma from blood, or a plasma fractionating membrane to separate and recover a specific plasma component selectively from the separated plasma. Thus it is not able to be used as a hollow fiber membrane for blood purification.

Japanese Kokai Publication J61-113460 discloses a membrane for continuous arterio-venous hemofiltration for hemodialysis or continuous blood filtration intended for treatment of acute renal insufficiency, but it is not practical for hemodialysis or blood filtration intended for treatment of chronic renal insufficiency.

In addition, no literature discloses a polysulfone membrane for blood purification not containing a hydrophilic polymer, which can remove selectively and efficiently low-molecular-weight proteins having molecular weight of 10,000 to 30,000 contained in blood.

SUMMARY OF THE INVENTION

In view of the prior art, an object of the present invention is to provide a polysulfone hollow fiber membrane for blood purification, which has no danger that any component of the membrane dissolves out, and which can be used suitably for hemodialysis and blood filtration and remove selectively and efficiently low-molecular-weight proteins having molecular weight of 10,000 to 30,000 contained in blood, and also to provide a blood purifier, which can be used suitably as a hemodialyzer, a filter for hemodiafiltration and a blood filter.

The hollow fiber membrane for blood purification of the present invention is a hollow fiber membrane for blood purification comprising a polysulfone resin, wherein there are slit-shaped micropores having an average width of 0.02 to 0.15 μm on the inner surface thereof; there are micropores having an average pore size of 0.1 to 1 μm on the outer surface thereof; the inside thereof has a sponge-like structure; there are no large voids having a diameter of more than 10 μm on the inner and outer surface thereof and inside the membrane; water permeability thereof is 400 to 2,500 ml/m$^2$·hr·mmHg; and a permeation ratio for the total proteins is 1% or less.

In addition, the blood purifier of the present invention is characterized by that the said hollow fiber membrane for blood purification of the invention is put into a cylindrical housing which is equipped with a blood inlet and a blood outlet, and either a dialysate solution inlet and a dialysate solution outlet or a filtrate outlet.

BRIEF DESCRIPTIONS OF THE DRAWINGS

DETAILED DESCRIPTION OF THE INVENTION

Figure 1:
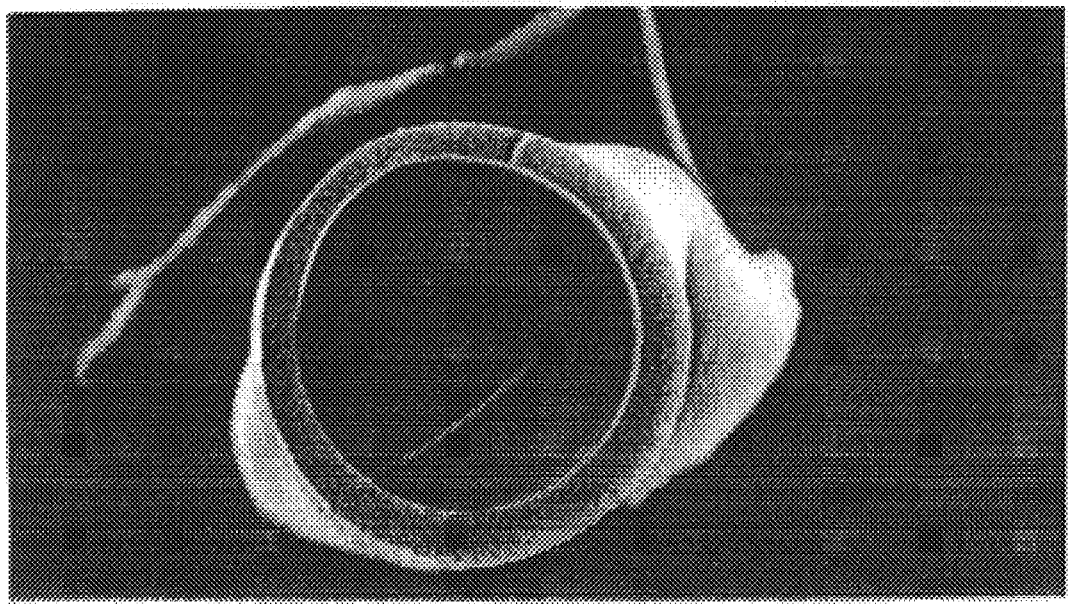
FIG. 1 is a scanning electron microscope (SEM) photograph showing a structure of the whole cross-section of the hollow fiber membrane for blood purification obtained in Example 1 (magnification of 200).
Figure 2:
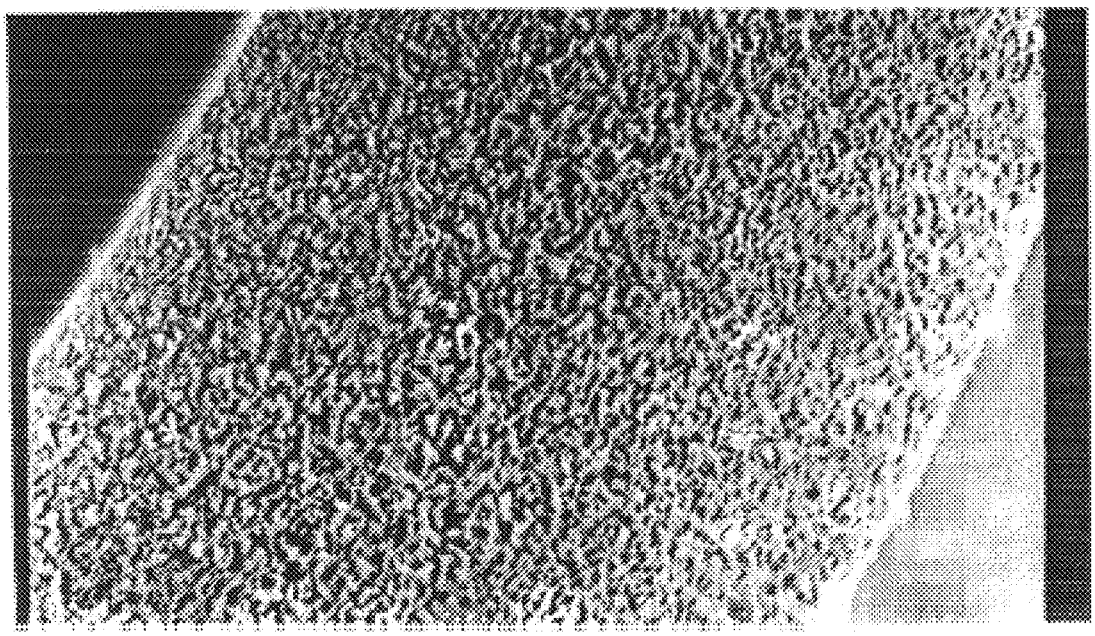
FIG. 2 is a SEM photograph showing a structure of the inside of the membrane of the hollow fiber membrane for blood purification obtained in Example 1 (magnification of 3,000).
Figure 3:
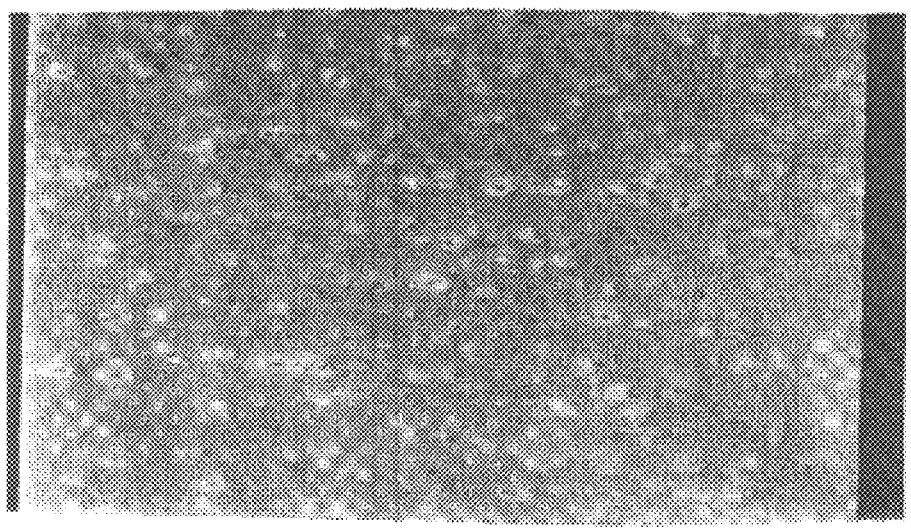
FIG. 3 is a SEM photograph showing a structure of the inner surface of the hollow fiber membrane for blood purification obtained in Example 1 (magnification of 10,000).
Figure 4:
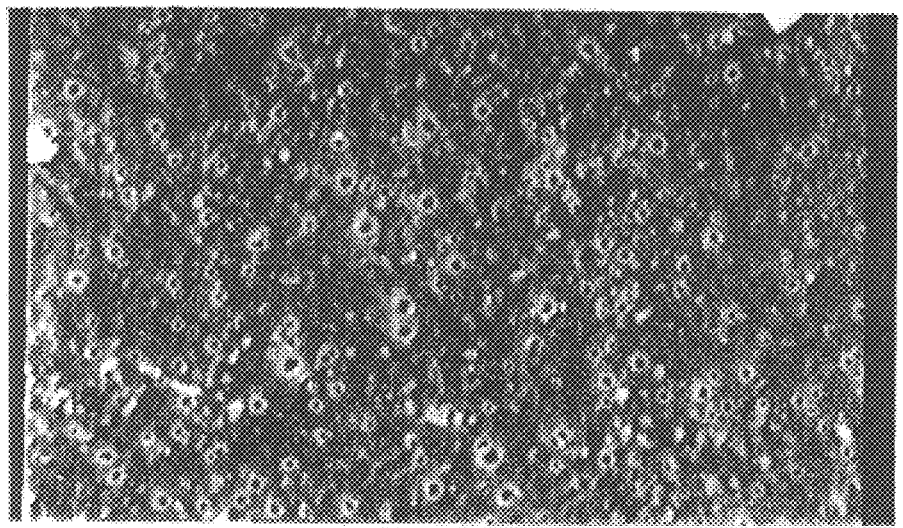
FIG. 4 is a SEM photograph showing a structure of the outer surface of the hollow fiber membrane for blood purification obtained in Example 1 (magnification of 5,000).

The hollow fiber membrane for blood purification of the invention comprises a polysulfone resin. The polysulfone resin is not specially limited to, but includes, for example, a resin having the repeating unit represented by the formula (1) shown below or a resin having the repeating unit represented by the formula (2) shown below.

can be confirmed, for example, by observing the inner surface of the hollow fiber membrane with SEM at magnification of 10,000.

The slit-shaped micropores are long and narrow along the fiber-axis direction of the hollow fiber membrane. A length of the micropore along the fiber-axis direction of the hollow fiber membrane is not specially limited, but a preferable length, for example, is 2 times or more, more preferably 3 times or more the minor axis of the micropore.

It is preferable that distribution density of the slit-shaped micropores on the inner surface of the membrane is uniformly distributed with high density. In addition, it is preferable that the minor axis of the slit-shaped micropore is uniform in size in order to lower leakage of useful proteins such as albumin and to obtain stable fractional property.

The lower limit of an average width of the said slit-shaped micropores is 0.02 μm. The average width herein means the average value of the minor axes of the micropores. When the average width is less than 0.02 μm, water permeability and ultrafiltration rate on blood filtration becomes small, and further fouling easily occurs with time, resulting in a decreased penetration ratio for uremic substances such as urea and creatinine. The more preferable lower limit of the average width is 0.04 μm.

The upper limit of the average width of the said slit-shaped micropores is 0.15 μm. When the average width exceeds 0.15 μm, leakage of proteins becomes large especially in case of blood filtration, resulting in hypoproteinemia so that problems in clinical applications may be revealed. The more preferable upper limit of the average width is 0.1 μm.

The hollow fiber membrane for blood purification of the invention has many micropores on the outer surface thereof. Existence of the micropores can be confirmed, for example, by observing the outer surface of the hollow fiber membrane with SEM and performing image analysis.

The lower limit of an average pore size of the micropores is 0.1 μm. The pore size of the micropore herein means the diameter obtained by converting the pore area obtained by the above-mentioned image analysis with assuming that the area is a circle, and an average pore size means an arithmetic mean obtained from the pore size of each pore and the

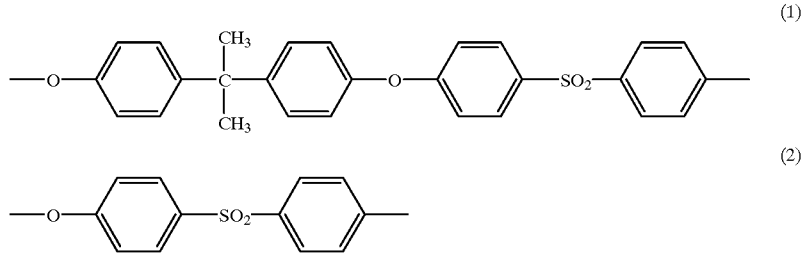

Among these, the resin having the repeating unit represented by the formula (1) has been utilized as a raw material for an ultrafiltration membrane for a long time. It is superior in basic characters such as mechanical strength, heat resistance, chemical resistance and biological compatibility. Thus it is particularly preferable as a raw material for the hollow fiber membrane for blood purification of the invention.

The hollow fiber membrane for blood purification of the invention has many slit-shaped micropores on the inner surface thereof. Existence of the said slit-shaped micropores number thereof. When the average pore size of the micropores is less than 0.1 μm, water permeability becomes small and ultrafiltration rate on blood filtration is lowered, and further clearance decreases. The preferable lower limit of the average pore size is 0.15 μm.

The upper limit of the average pore size of the micropores is 1 μm. When the average pore size exceeds 1 μm, leakage of useful proteins such as albumin increases, and further surface strength of the membrane becomes small and it may easily be damaged in handling. The preferable upper limit of the average pore size is 0.8 μm.

It is preferable that the above-mentioned micropores are uniform in pore size, but they are not specially needed to be uniform and they may lack uniformity.

The lower limit of a porosity of the micropores on the outer surface of the hollow fiber membrane for blood purification of the invention is preferably 1%. The porosity of the micropores on the outer surface herein means percentage of the total sum of the opening pore area of each pore per area to the outer surface area. When the porosity is less than 1%, water permeability becomes low. The more preferable lower limit of the porosity is 5%. The upper limit of the porosity of the micropores on the outer surface of the hollow fiber membrane for blood purification of the invention is preferably 30%. When the porosity exceeds 30%, surface strength becomes small and the membrane is easily damaged in handling. The more preferable upper limit of the porosity is 25%. When it is within the above-mentioned range, it is preferable in view of balance between permeability and mechanical strength of the membrane.

The hollow fiber membrane for blood purification of the invention has a fine active layer having a thickness of about 1 to 5 $\mu$m on the inner surface, and the inside of the membrane has a sponge-like structure formed by being continuous with the said fine layer. In this case, the structure of the whole membrane is unsymmetrical because the structure of the hollow fiber membrane for blood purification of the invention has such a structure that the inner surface has a fine active layer and the inside of the membrane is a sponge-like structure formed by being continuous with the said active layer.

Moreover, it is preferable that the hollow fiber membrane has an unsymmetrical structure, which has a fine active layer comprising aggregate of coagulated particles, in the inner surface side.

Generally speaking, the active layer is a crucial part for permeability of the membrane, and sizes of the coagulated particles constituting this is an important factor to decide its performance. As diameters of the coagulated particles constituting the said active layer are small and they aggregate finely, permeability of the membrane becomes low. Conversely, as diameters of the coagulated particles are large and they aggregate coarsely, permeability of the membrane becomes high.

The hollow fiber membrane for blood purification of the invention reveals selective permeability by controlling sizes of the said coagulated particles.

The sizes of the coagulated particles can be changed by controlling a coagulation speed on the inner surface of the hollow fiber membrane for blood purification of the invention. Thus, the sizes of the coagulated particles become small and further a skin layer is formed when a substance, which has large coagulative power for a spinning solution, is used as an internal coagulant. On the contrary, the sizes of the coagulated particles become large and further a network structure is formed when a substance, which has small coagulative power for a spinning solution, is used as an internal coagulant. The size also depends on a polymer concentration in the spinning solution.

An average diameter of the coagulated particles is preferably 0.1 to 0.7 $\mu$m. The average diameter can be obtained as an average value of diameters of the coagulated particles by observing the inner surface side section of the hollow fiber membrane with SEM at magnification of 5,000.

When the average diameter of the coagulated particles is too large, gaps between the coagulated particles becomes large. Thus, leakage of albumin becomes large resulting in hypoproteinemia so that clinical problems come out. Conversely, when the average diameter of the coagulated particles is too small, gaps between the coagulated particles and water permeability becomes small. In addition, ultrafiltration rate on blood filtration becomes small, and further permeability for low-molecular-weight proteins having molecular weight of 10,000 to 30,000 decreases.

The inside of the membrane of the hollow fiber membrane for blood purification of the invention has a sponge-like structure formed by being continuous with the above-mentioned active layer. It is preferable that pore sizes of the sponge-like structure is uniform, but it is not specially needed to be uniform and it may lack of uniformity. The preferable pore sizes of the sponge-like structure are 0.1 to 3 $\mu$m.

The hollow fiber membrane for blood purification of the invention have no large void having a diameter of more than 10 $\mu$m on the inner and outer surface thereof and inside the membrane. When a large void exceeding 10 $\mu$m in diameter exists, mechanical strength of the hollow fiber membrane decreases.

An inner diameter of the hollow fiber membrane for blood purification of the invention is preferably 100 to 300 $\mu$m and more preferably 180 to 250 $\mu$m. When the inner diameter of the hollow fiber membrane is less than 100 $\mu$m, pressure drop becomes large and further thrombus easily come out. Conversely, when it exceeds 300 $\mu$m, the number of the hollow fiber membrane capable of being put into a module decreases, and thus clearance and filterability per module become small because effective membrane area becomes small.

A thickness of the hollow fiber membrane for blood purification of the invention is not specially limited, but it is desirable to be 10 to 50 $\mu$m in order to maintain clearance, permeability and mechanical strength of the membrane adequately.

The lower limit of water permeability of the hollow fiber membrane for blood purification of the invention is 400 ml/m$^2$·hr·mmHg. The water permeability herein means the water permeability measured after the hollow fiber membrane are hydrophilized with an aqueous ethanol solution beforehand and then the aqueous ethanol solution is substituted with water. When the water permeability is less than 400 ml/m$^2$·hr·mmHg, ultrafiltration rate on blood filtration is lowered to decrease a flow rate, and an effective treatment becomes difficult. In addition, since fouling easily occurs in the membrane, permeability for blood components decreases with time and, in hemodialysis, clearance is lowered. The preferable lower limit of the water permeability is 500 ml/m$^2$·hr·mmHg.

The upper limit of the water permeability of the hollow fiber membrane for blood purification of the invention is 2,500 ml/m$^2$·hr·mmHg. When it exceeds 2,500 ml/m$^2$·hr·mmHg, leakage of useful proteins such as albumin increases. The preferable upper limit of the water permeability is 1,800 ml/m$^2$·hr·mmHg.

The hollow fiber membrane for blood purification of the invention has a permeation ratio for the total proteins of 1% or less. The permeation ratio for the total protein herein means the permeation ratio for the total proteins in blood measured on blood filtration with using bovine blood after the hollow fiber membrane is hydrophilized with an aqueous ethanol solution beforehand and then substituting the aqueous ethanol solution with a physiological saline in the same manner as the said measurement of the water permeability. When the permeation ratio for the total proteins exceeds 1%, leakage of proteins becomes large in hemodialysis and blood filtration.

Additionally, the hollow fiber membrane for blood purification of the invention preferably has a permeation ratio for lysozyme of 30 to 70% and a permeation ratio for albumin of 8 to 20%.

The lower limit of the permeation ratio for lysozyme is 30% in the hollow fiber membrane for blood purification of the invention. The permeation ratio for lysozyme herein means the permeation ratio for lysozyme measured on blood filtration with using lysozyme-added bovine blood after the hollow fiber membrane is hydrophilized with an aqueous ethanol solution beforehand and then substituting the aqueous ethanol solution with a physiological saline. Lysozyme is a protein having molecular weight of 14,600 and has the same level of the molecular weight of low-molecular-weight proteins contained in blood, so that it is used in the invention as an index which shows permeability for the low-molecular-weight proteins.

When the lower limit of the permeation ratio for lysozyme is less than 30%, permeability for low-molecular-weight proteins in blood becomes low. The preferable lower limit of the permeation ratio for lysozyme is 40%.

When the upper limit of the permeation ratio for lysozyme exceeds 70%, leakage of useful proteins such as albumin becomes large. The preferable upper limit of the permeation ratio for lysozyme is 65%.

The lower limit of the permeation ratio for albumin is 8% in the hollow fiber membrane for blood purification of the invention. The permeation ratio for albumin herein means the permeation ratio for bovine serum albumin measured with using a 1% bovine serum albumin-phosphate buffer solution after the hollow fiber membrane is hydrophilized with an aqueous ethanol solution beforehand and then substituting the aqueous ethanol solution with a physiological saline.

When the permeation ratio for albumin is less than 8%, the permeation ratio for lysozyme becomes small and further ultrafiltration rate on blood filtration decreases. The fact that the permeation ratio for albumin is 8% means that the permeation ratio for the total proteins in blood system is about 0.1%. The preferable lower limit of the permeation ratio for albumin is 9%.

The upper limit of the permeation ratio for albumin is 20% in the hollow fiber membrane for blood purification of the invention. When the permeation ratio for albumin exceeds 20%, leakage of proteins becomes too large. The fact that the permeation ratio for albumin is 20% means that the permeation ratio for the total proteins in blood system is about 0.9%. The preferable upper limit of the permeation ratio for albumin is 18%.

The hollow fiber membrane for blood purification of the invention can be prepared in the following way.

For example, as disclosed in Japanese Kokai Publication J60-222112, it can be obtained by mixing a solvent, which does not dissolve a polysulfone resin, or a swelling agent with a solution comprising a polysulfone resin and its good solvent and then preparing a membrane just before phase separation occurs. Thus, in a method for forming a hollow fiber membrane, characterized by extruding a spinning solution containing a polysulfone resin with an internal coagulant from a circular nozzle, and then contacting the whole with an external coagulant immediately or after passing a dry zone of not more than 50 cm, more preferably not more than 20 cm from the nozzle, the hollow fiber membrane for blood purification of the invention can be prepared by adjusting the composition of the spinning solution so as to occur phase separation while temperature decreases. extruding the spinning solution from the circular nozzle keeping the temperature of the solution not lower than the temperature at which phase separation occurs, and further keeping at least one of the temperature selected from the internal coagulant temperature, the gas temperature surrounding the hollow fiber membrane in dry zone, and the external coagulant temperature lower than the temperature at which phase separation occurs.

In preparing the hollow fiber membrane for blood purification of the invention, it is preferable that a polysulfone resin concentration in the spinning solution is 8 to 25% by weight, more preferably 12 to 23% by weight. When the polysulfone resin concentration is below 8% by weight, viscosity of the spinning solution becomes too low and spinning becomes difficult. When it exceeds 25%, the pore size on the inner and outer surface, especially on the outer surface, of the hollow fiber membrane becomes too small, resulting in decreased water permeability and decreased clearance.

In producing the hollow fiber membrane for blood purification of the invention, if necessary, a pore size-maintaining agent such as glycerin may be coated on the hollow fiber membrane after coagulation and solvent-removing process, and then the hollow fiber membrane is subjected to drying to obtain a module.

The reason is not clear why the hollow fiber membrane for blood purification of the invention reveals the above-mentioned superior effects, but it may be supposed that, by making the slit-shaped micropores on the inner surface of the hollow fiber membrane, leakage of proteins which are substantially spherical, can be prevented so that water permeability, blood filterability and clearance can be kept high.

It may also be supposed that gaps between the coagulated particles of the active layer on the inner surface are micropores and thus fouling hardly occurs so that good selectivity can be obtained, as well as water permeability, blood filterability and clearance can be kept high.

The blood purifier of the invention is constructed by putting the above-mentioned hollow fiber membrane for blood purification of the invention into a cylindrical housing.

The above-mentioned cylindrical housing is equipped with a blood inlet, by which blood flows in, and a blood outlet, by which blood flows out. Moreover, when the blood purifier of the invention is used as a hemodialyzer or a filter for hemodiafiltration, this housing is equipped with a dialysate solution inlet, by which dialysate solution flows in, and a dialysate solution outlet, by which dialysate solution flows out. When the blood purifier of the invention is used as a hemofilter, this housing is equipped with a filtrate outlet, by which filtrate flows out. As an example of the housing, one made of a plastic such as polycarbonate can be mentioned.

The blood purifier of the invention is quite suitable as a hemodialyzer, a filter for hemodiafiltration, and a hemofilter because the safe hollow fiber membrane is used, which has no danger of leaking out any components of the membrane.

The blood purifier of the invention is explained in more details by referring to drawings, but the blood purifier of the invention is not limited to these.

Figure 7:
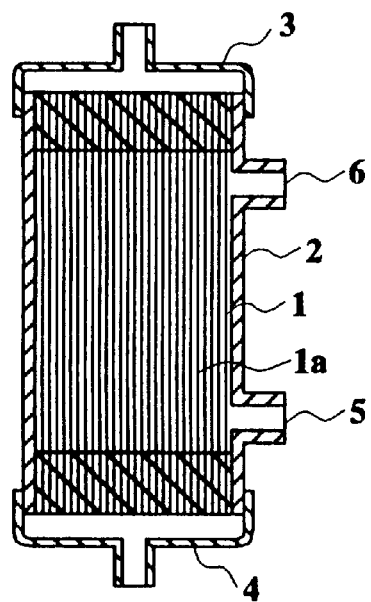
FIG. 7 is a schematic illustration showing the first embodiment of the blood purifier of the invention.

In cases of using as a hemodialyzer or a filter for hemodialysis, the blood purifier of the invention is constructed, as shown in FIG. 7, by the following processes; (1) putting a bundle of hollow fiber membranes 1 comprising many hollow fiber membranes for blood purification 1a into a cylindrical housing 2; (2) forming a partition by adhering and fixing both ends of the bundle of the hollow fiber to an inner wall of the housing with the help of a resin such as polyurethane; (3) opening a hollow part by cutting its both ends; and (4) adhering a header 3 for blood inflow and a header 4 for blood outflow. Since the blood purifier of this embodiment is used as a hemodialyzer or a filter for hemodiafiltration, a dialysate solution inlet 5 and a dialysate solution outlet 6, which are connected to gaps within the bundle, are attached to sides of both ends of the housing 2.

Figure 8:
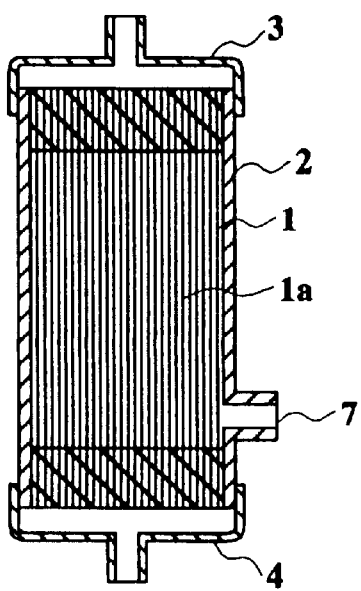
FIG. 8 is a schematic illustration showing the second embodiment of the blood purifier of the invention.

FIG. 8 is a schematic illustration representing one embodiment when the blood purifier of the invention is used as a hemofilter. In this embodiment, a filtrate outlet 7, which is connected to gaps within the bundle, is attached for flowing out blood filtrate.

BEST MODE FOR CARRYING OUT THE INVENTION

The invention is explained in more details in the following by using Examples, but the invention is not limited to only these.

EXAMPLE 1

A hollow fiber was formed by extruding a spinning solution having a phase separation temperature of 70° C., which comprises 22% by weight of polysulfone resin (Amoco Performance Products, P-1700), 23% by weight of propylene glycol and 55% by weight of N-methyl-2-pyrrolidone, from the outside outlet of a circular spinning nozzle with a rate of 1.6 g/min at 80° C., and simultaneously extruding an N-methyl-2-pyrrolidone 50%-by-weight aqueous solution as an internal coagulant inside of each forming fiber with a rate of 1.9 g/min. After passing this hollow fiber through a dry zone of 10 cm from the nozzle, it was led into warm water of 55° C. to be coagulated and washed with water. It was then wound up on a hank with a speed of 55 m/min to obtain a hollow fiber membrane with an inside diameter of 200 $\mu$m and a thickness of 25 $\mu$m.

This hollow fiber membrane was cured for one hour with boiling water and remove the solvent, and after drying it, its structure was observed with SEM. The image analysis was performed by using Personal Image Analysis System-III (made by Inter Quest company). The following were found from results obtained above: there are many slit-shaped micropores having an average width of 0.06 $\mu$m on the inner surface; there are many micropores having an average pore size of 0.2 $\mu$m on the outer surface; the inside of the membrane is a sponge-like structure, and no large void having a diameter of more than 10 $\mu$m on the inner and outer surface and inside the membrane. These SEM photographs were shown in FIG. 1 to FIG. 4.

EXAMPLE 2

A mini-module having an effective length of 18 cm and an effective surface area of 0.04 m$^2$ was prepared by bundling 360 hollow fiber membranes of Example 1. putting this bundle into a casing made of polycarbonate and adhering and fixing both ends with polyurethane. Then, the hollow fiber membranes in this mini-module were hydrophilized with an aqueous ethanol solution, and subsequently the aqueous ethanol solution was substituted with water. This mini-module was kept warm at 37° C. and water at 37° C. was introduced into the inside of the hollow fiber membranes with a flow rate of 6.5 ml/min by a roller pump to perform full filtration. By measuring the pressure at the mini-module inlet, water permeability was measured. It was found that the water permeability was 1,000 ml/m$^2$·hr·mmHg.

EXAMPLE 3

The water contained in the mini-module of Example 2 was substituted with a physiological saline and it was supplied for a filtration test by using bovine blood. Bovine blood was adjusted beforehand so as to be hematocrit of 30% and the total proteins concentration of 6–7 g/dl by using bovine blood added with sodium citrate. Urea, creatinine and uric acid were further dissolved in this bovine blood at concentrations of 100 mg/dl, 10 mg/dl and 10 mg/dl, respectively.

This bovine blood was introduced into the inside of the hollow fiber membranes in the above-mentioned mini-module at a flow rate of blood of 6.5 ml/min with a roller pump. A filtration test was performed at a temperature of 37° C. by setting the condition so as to keep the transmembrane pressure (TMP) at about 100 mmHg with a filtration rate being within a range of 1.5 to 2.5 ml/min. Such a bovine blood filtration test was carried out for four hours, and each permeation ratio for the total proteins, urea, creatinine or uric acid was measured every one hour. The permeation ratio for the total proteins after the first one hour was taken as a permeation ratio for the total proteins.

The permeation ratios were obtained by measuring the concentrations of each component in blood at an inlet, outlet of the mini-module and in the filtrate, then dividing the value of the concentration in the filtrate by the mean value of those in blood at an inlet and outlet of the mini-module. The total proteins concentration in the filtrate was measured by pyrogallol red method.

The Results are shown in Table 1. The permeation ratio for the total proteins (a value after one hour) was 0.37%. There was almost no change with time in each of the permeation ratio for the total proteins, urea, creatinine or uric acid to cause a stable blood filtration.

EXAMPLE 4

A module having an effective length of 19 cm and an effective surface area of 1.3 m$^2$ was prepared by bundling 11,000 hollow fiber membranes of Example 1. Then, the hollow fiber membranes in this module were hydrophilized with an aqueous ethanol solution, and subsequently the aqueous ethanol solution was substituted with water. By using this module, clearance was measured under such a condition that a flow rate of blood side (QB) was 200 ml/min, a flow rate of dialysate side (QD) was 500 ml/min and TMP was 0 mmHg in accordance with the method described in "Evaluation Standard of Dialyzer Performance" edited by Japanese Association of Artificial Organs. As a result, the following value was obtained: 173 ml/min for urea; 166 ml/min for creatinine; 158 ml/min for uric acid; and 161 ml/min for inorganic phosphate. It was found from the results obtained above that this hollow fiber membrane had sufficient clearance.

COMPARATIVE EXAMPLE 1

A hollow fiber membrane having an inside diameter of 200 $\mu$m and a thickness of 25 $\mu$m was obtained by spinning in the same manner as Example 1 except for using a spinning solution comprising 30% by weight of polysulfone resin, 18% by weight of propylene glycol and 52% by weight of N-methyl-2-pyrrolidone, using propylene glycol as the internal coagulant, and a spinning temperature being 90° C.

By observing the structure thereof by the same method as that of Example 1, there were many slit-shaped micropores having an average width of 0.07 $\mu$m on the inner surface of this hollow fiber membrane, but no micropores were recognized on the outer surface. The inside of the membrane was a sponge-like structure and there were no large voids having a diameter not less than 10 μm on the inner and outer surface and inside the membrane. The sponge-like structure of the inside of the membrane was relatively dense. It was assumed that the micropores on the outer surface could not be formed due to too high concentration of a polysulfone resin.

The water permeability of this hollow fiber membrane was measured by the same method as that of Example 2. It was found that the water permeability was 110 ml/m$^2$·hr·mmHg.

Furthermore, a bovine blood filtration test for this hollow fiber membrane was carried out by the same method as that of Example 3. When a flow rate of filtrate was set to 1.5 ml/min or up, TMP rose up to 200 mmHg and over. Thus, this filtration test was forced to be stopped.

COMPARATIVE EXAMPLE 2

A hollow fiber membrane having a inside diameter of 200 μm and a thickness of 30 μm was obtained by spinning in the same manner as Example 1 except for using a spinning solution comprising 18% by weight of polysulfone resin, 24% by weight of propylene glycol and 58% by weight of N-methyl-2-pyrrolidone (its phase separation temperature being 68° C.), the extruding speed of the solution being 3.6 g/min, and using water as the internal coagulant.

By observing the structure thereof by the same method as that of Example 1, there were many micropores having an average pore size of 0.5 μm on the outer surface of this hollow fiber membrane. but clear slit-shaped micropores were not recognized on the inner surface. The inside of the membrane was a sponge-like structure and there were no large voids having a diameter of 10 μm or more on the inner and outer surface and inside the membrane. It was assumed that slit-shaped micropores could not be formed on the inner surface due to too strong coagulative force of the internal coagulant.

The water permeability of this hollow fiber membrane was measured by the same method as that of Example 2. It was found that the water permeability was 580 ml/m$^2$·hr·mmHg.

Furthermore, a bovine blood filtration test for this hollow fiber membrane was carried out by the same method as that of Example 3. The results are shown in Table 1. The permeation ratio for the total proteins (a value after one hour) was 0.04% or less, but TMP rose up with time and a flow rate of filtrate was forced to be lowered to 1.5 ml/min or less in 180 minutes after the start. Each of the permeation ratio for urea, creatinine or uric acid decreased with time, and stable blood filtration was not able to be performed.

EXAMPLE 5

A hollow fiber membrane having an inside diameter of 200 μm and a thickness of 30 μm was obtained by spinning in the same manner as Example 1 except for using a spinning solution having a phase separation temperature of 68° C., which comprised 18% by weight of polysulfone resin, 24% by weight of propylene glycol and 58% by weight of N-methyl-2-pyrrolidone, the extruding speed of the solution being 3.6 g/min, using a 40%-by-weight aqueous solution of N-methyl-2-pyrrolidone as an internal coagulant.

When the structure thereof was observed by the same method as that of Example 1, there were many slit-shaped micropores having an average width of 0.1 μm on the inner surface of this hollow fiber membrane and there were many micropores having an average pore size of 0.6 μm on the outer surface. The inside of the membrane was a sponge-like structure and there were no large voids having a diameter of 10 μm or more on the inner and outer surface and inside the membrane.

The water permeability of this hollow fiber membrane was measured by the same method as that of Example 2. It was found that the water permeability was 1,300 ml/m$^2$·hr·mmHg.

Furthermore, a bovine blood filtration test for this hollow fiber membrane was performed by the same method as that of Example 3. The results are shown in Table 1. The permeation ratio for the total proteins (a value after one hour) was 0.89%. There were almost no change with time in each of the permeation ratio for the total proteins, urea, creatinine or uric acid, so that a stable blood filtration was performed.

EXAMPLE 6

The hollow fiber membrane spun in Example 1 was wound up on a hank, and it was immersed in an aqueous solution of 45% by weight of glycerin for 5 minutes, followed by drying.

A mini-module was prepared by using this hollow fiber membrane by the same method as that of Example 2. Without making this mini-module hydrophilic with an aqueous ethanol solution, a bovine blood filtration test was performed by the same method as that of Example 3. The results are shown in Table 1. The permeation ratio for the total proteins (a value after one hour) was 0.45%. There were almost no change with time in each of the permeation ratio for the total proteins, urea, creatinine or uric acid, and stable blood filtration was able to be performed as the case of making it hydrophilic with an aqueous ethanol solution.

EXAMPLE 7

A hollow fiber was formed by extruding a spinning solution having a phase separation temperature of 57° C., which comprises 22% by weight of polysulfone resin, 31% by weight of dipropylene glycol and 47% by weight of N-methyl-2-pyrrolidone, from the outside outlet of a circular spinning nozzle with a rate of 1.6 g/min at 75° C., and extruding simultaneously an N-methyl-2-pyrrolidone 40%-by-weight aqueous solution as an internal coagulant inside of each forming fiber with a rate of 1.9 g/min. After passing this hollow fiber through a dry zone of 10 cm from the nozzle, this extruded fiber was led into warm water of 50° C. to be coagulated and washed with water. It was wound up on a hank with a speed of 55 m/min to obtain a hollow fiber membrane with an inside diameter of 200 μm and a thickness of 25 μm.

The structure thereof was observed by the same method as that of Example 1. As a result, there were many slit-shaped micropores having an average width of 0.03 μm on the inner surface of this hollow fiber membrane; there were many micropores having an average pore size of 0.2 μm on the outer surface; the inside of the membrane was a sponge-like structure; and there were no large voids having a diameter of 10 μm or more on the inner and outer surface and inside the membrane.

The water permeability of this hollow fiber membrane was measured by the same method as that of Example 2. It was found that the water permeability was 540 ml/m$^2$·hr·mmHg.

Furthermore, a bovine blood filtration test on this hollow fiber membrane was performed by the same method as that of Example 3. As a result, the permeation ratio for the total proteins (a value after one our) was 0.04% or less, but there were almost no change with time in each permeation ratio for urea, creatinine or uric acid to cause a stable blood filtration.

TABLE 1

| | Time (min) | Permeation ratio (%) | | | | Flow rate of filtrate | TMP (mmHg) |
| --- | --- | --- | --- | --- | --- | --- | --- |
| | | Total protein | Urea | Creat-inine | Urea | | |
| Example 3 | 60 | 0.37 | 102 | 103 | 98 | 2.0 | 101 |
| | 120 | 0.36 | 103 | 102 | 96 | 2.0 | 101 |
| | 180 | 0.30 | 102 | 105 | 99 | 2.0 | 99 |
| | 240 | 0.31 | 103 | 103 | 95 | 2.0 | 103 |
| Example 5 | 60 | 0.89 | 89 | 91 | 97 | 2.2 | 95 |
| | 120 | 0.61 | 107 | 108 | 98 | 2.2 | 98 |
| | 180 | 0.62 | 103 | 106 | 102 | 2.2 | 102 |
| | 240 | 0.58 | 94 | 95 | 100 | 2.2 | 105 |
| Example 6 | 60 | 0.45 | 103 | 103 | 98 | 1.8 | 96 |
| | 120 | 0.45 | 104 | t02 | 97 | 1.8 | 98 |
| | 180 | 0.36 | 101 | 103 | 98 | 1.8 | 103 |
| | 240 | 0.31 | 101 | 102 | 97 | 1.8 | 105 |
| Example 7 | 60 | <0.04 | 102 | 107 | 100 | 1.7 | 102 |
| | 120 | <0.04 | 104 | 108 | 97 | 1.7 | 101 |
| | 180 | <0.04 | 102 | 98 | 98 | 1.6 | 103 |
| | 240 | <0.04 | 100 | 99 | 96 | 1.5 | 105 |
| Compara-tive Example 2 | 60 | <0.04 | 97 | 99 | 99 | 1.6 | 102 |
| | 120 | 0.05 | 106 | 105 | 100 | 1.5 | 100 |
| | 180 | <0.04 | 67 | 63 | 102 | 1.3 | 104 |
| | 240 | <0.04 | 59 | 60 | 80 | 1.0 | 110 |

EXAMPLE 8

A hollow fiber membrane having an inside diameter of 200 μm and a thickness of 25 μm was obtained by spinning in the same manner as Example 7 except for using an aqueous solution of 50% by weight of N-methyl-2-pyrrolidone as an internal coagulant.

This hollow fiber membrane was cured for one hour with boiling water and remove the solvent, and after drying, the side section of its inner surface was observed with SEM at magnification of 5,000. As a result, the following was found: this hollow fiber membrane has an unsy metrical structure having a fine active layer on the inner surface side of this hollow fiber membrane; the active layer comprises aggregate of coagulated particles; an average diameter of the coagulated particles is 0.2 μm; a thickness of the active layer is about 2 μm; the inside of the membrane has a sponge-like structure formed by being continuous with the active layer; a pore size of this sponge-like structure is 0.2–0.5 μm; and there were many micropores having a pore size of 0.1–0.3 μm on the outer surface of this hollow fiber membrane.

Figure 5:
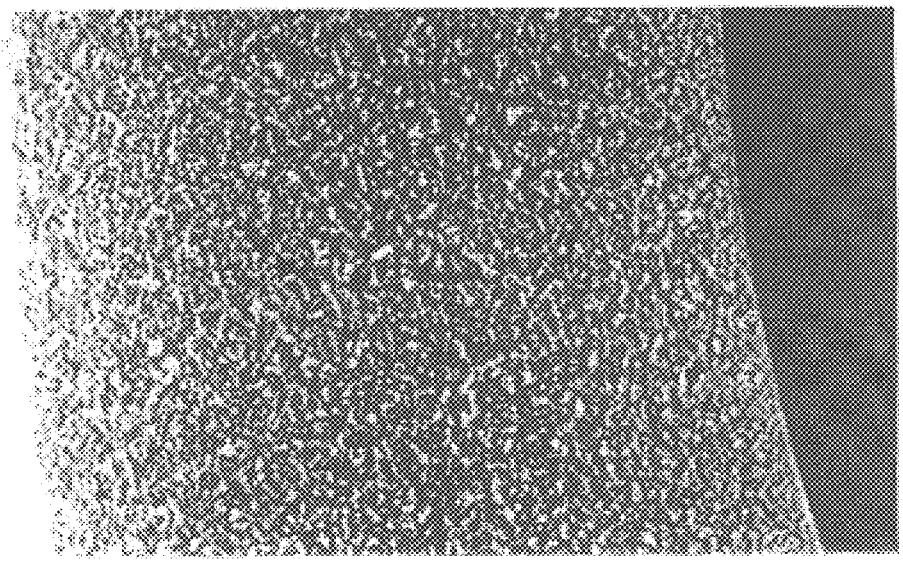
FIG. 5 is a SEM photograph showing a structure of the whole cross-section of the hollow fiber membrane for blood purification obtained in Example 8 (magnification of 3,000).
Figure 6:
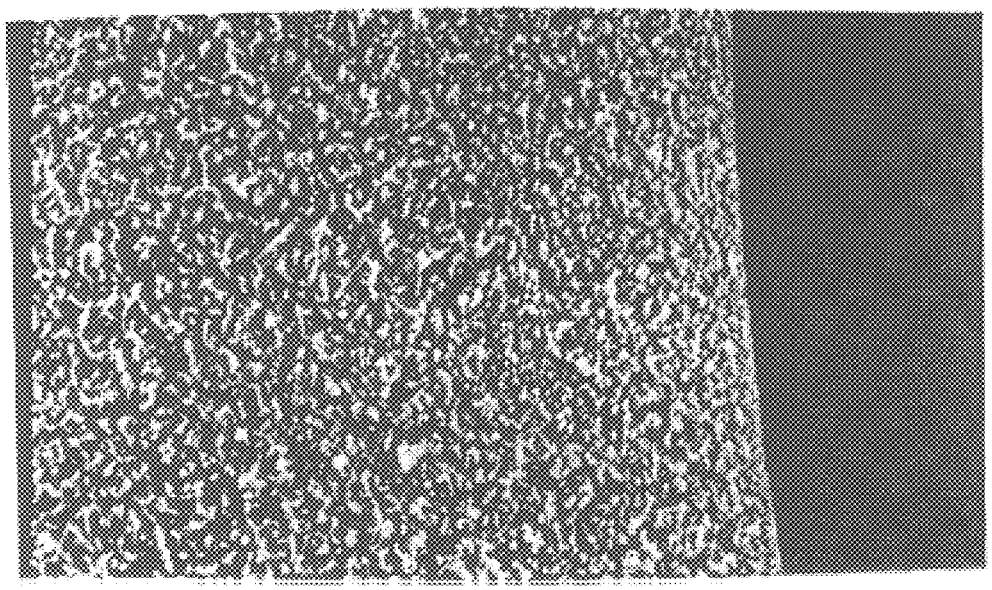
FIG. 6 is a SEM photograph showing a structure of the inner surface side section of the hollow fiber membrane for blood purification obtained in Example 8 (magnification of 5,000).

SEM photographs of this hollow fiber membrane are shown in FIG. 5 and FIG. 6.

EXAMPLE 9

(1) Mini-module: A mini-module was prepared by the same method as that of Example 2 after bundling 360 hollow fiber membranes of Example 8. Then, the hollow fiber membranes in this mini-module were hydrophilized with an aqueous ethanol solution, and the aqueous ethanol solution was substituted with a physiological saline.

(2) Bovine serum albumin-phosphate buffer: Into 1-L water were dissolved 8.77 g of NaCl, 15.15 g of $Na_2HPO_4 \cdot 12H_2O$ and 1.05 g of $KH_2PO_4$ and its pH was adjusted to 7. 5 with NaOH. Into this was dissolved 10 g of bovine serum albumin (Fraction V, made by SIGMA CHEMICAL company), and its pH was adjusted to 7.5 once again. Then, this solution was filtered with a plasma separating membrane to remove undissolved substance etc.

(3) Permeability test: The mini-module obtained in (1) was kept warm at 37° C., and the bovine serum albumin-phosphate buffer kept warm at 37° C. was introduced into the insides of the hollow fiber membranes in the mini-module at a flow rate of 4 ml/min with a roller pump, and a permeability test was performed with keeping a flow rate at filtrate of 0.6 ml/min.

Such a permeability test was performed for one hour, and the permeation ratio after one hour was measured as a permeation ratio for albumin. The permeation ratio was obtained by measuring bovine serum albumin concentrations at a mini-module inlet and outlet for a permeating raw solution and in the filtrate, and dividing the value of the concentration in the filtrate by the mean value of the concentrations at the mini-module inlet and outlet. The bovine serum albumin concentrations were measured by BCG (bromocresol green) method. As a result, the permeation ratio for albumin is 11%.

EXAMPLE 10

A permeation ratio for lysozyme was measured by using the same mini-module as that of (1) in Example 9.

(1) Bovine blood: Bovine blood was adjusted beforehand so as to be hematocrit of 30% and the total proteins concentration of 6–7 g/dl by using bovine blood added with sodium citrate. Lysozyme (egg white origin, made by SIGMA CHEMICAL company) was dissolved into this solution at a concentration of 5 mg/dl. Urea, creatinine and uric acid were simultaneously dissolved into the above solution at concentrations of 100 mg/dl, 10 mg/dl and 10 mg/dl, respectively.

(2) Bovine blood filtration test: A bovine blood filtration test was performed for four hours by the same method as that of Example 3 to measure a permeation ratio for lysozyme, urea, creatinine, uric acid or the total proteins every one hour. The permeation ratio for lysozyme after two hours was taken as the permeation ratio for lysozyme.

The permeation ratios were obtained by measuring concentrations of each component in blood at a mini-module inlet and outlet and in the filtrate, and dividing the value of the concentration in the filtrate by the mean value of concentrations at the mini-module inlet and outlet. The total proteins concentrations were measured by pyrogallol red method.

The results are shown in Table 2. The permeation ratio for lysozyme (a value after two hours) is 49%. The permeation ratio for the total proteins at that time is 0.15%, and it was found that this membrane had sharp fractional ability.

There were almost no change with time in the permeation ratio for each component to cause stable blood filtration.

EXAMPLE 11

A module having an effective length of 19 cm and an effective membrane area of 1.3 m² was prepared by bundling 11,000 hollow fiber membranes of Example 8. Then, clearance of this module was measured by the same method as that of Example 4. As a result, the following value was obtained: 178 ml/min for urea; 170 ml/min for creatinine; 162 ml/min for uric acid; and 163 ml/min for inorganic phosphate. It was found from the results obtained above that this hollow fiber membrane had sufficient clearance.

EXAMPLE 12

A hollow fiber membrane having an inside diameter of 200 μm and a thickness of 25 μm was obtained by spinning in the same manner as Example 1 except for using a spinning solution having a phase separation temperature of 68° C., which comprised 20% by weight of polysulfone resin, 23% by weight of propylene glycol and 57% by weight of N-methyl-2-pyrrolidone.

By observing the structure thereof by the same method as that of Example 8, the following was found: this hollow fiber membrane has an unsymmetrical structure having a fine active layer on the inner surface side of this hollow fiber membrane; the active layer comprises aggregate of coagulated particles; an average diameter of the coagulated particles is 0.3 μm; a thickness of the active layer is about 2 μm; the inside of the membrane has a sponge-like structure formed by being continuous with the active layer; a pore size of this sponge-like structure is 0.2–0.6 μm; and there were many micropores having a pore size of 0.2–0.6 μm on the outer surface of this hollow fiber membrane.

The permeation ratio for albumin of this hollow fiber membrane was measured by the same method as that of Example 9. It was found that the permeation ratio for albumin was 17%.

Furthermore, a bovine blood filtration test was performed on this hollow fiber membrane by the same method as that of Example 10. The results are shown in Table 2. The permeation ratio for lysozyme (a value after 2 hours) is 60%. The permeation ratio for the total proteins at that time is 0.54%, and it was found that this membrane had sharp fractional ability.

There were almost no change with time in the permeation ratio for each component so that stable blood filtration was performed.

COMPARATIVE EXAMPLE 3

A hollow fiber membrane having an inside diameter of 200 μm and a thickness of 25 μm was obtained by spinning in the same manner as Example 12 except for using a 10%-by-weight aqueous solution of N-methyl-2-pyrrolidone as an internal coagulant.

By observing the structure thereof by the same method as that of Example 8, this hollow fiber membrane had an unsymmetrical structure having a fine active layer on the inner surface, but this fine layer was a skin layer instead of aggregate of coagulated particles. A thickness of this skin layer was about 2 μm. But the inside of the membrane was a sponge-like structure formed by being continuous with the skin layer. The pore size of this sponge-like structure was 0.2–0.5 μm. There were many micropores having a pore size 0.1–0.3 μm on the outer surface of this hollow fiber membrane.

The permeation ratio for albumin of this hollow fiber membrane was measured by the same method as that of Example 9. It was found that the permeation ratio for albumin was 4%.

Furthermore, a bovine blood filtration test was performed on this hollow fiber membrane by the same method as that of Example 10. The permeation ratio for lysozyme (a value after 2 hours) was 10%. The permeation ratio for the total proteins at that time was 0.03% or less.

It was assumed that the permeation ratio for lysozyme was lowered because the inner surface was a skin layer.

TABLE 2

| | Time (min) | Permeation ratio (%) | | | | |
| --- | --- | --- | --- | --- | --- | --- |
| | | Lysozyme | Urea | Creatinine | Uric acid | Total protein |
| Example 10 | 60 | 48 | 107 | 107 | 101 | 0.19 |
| | 120 | 49 | 107 | 106 | 100 | 0.15 |
| | 180 | 49 | 106 | 105 | 100 | 0.15 |
| | 240 | 51 | I06 | 104 | 100 | 0.14 |
| Example 12 | 60 | 58 | 108 | 109 | 102 | 0.63 |
| | 120 | 60 | 105 | t05 | 101 | 0.54 |
| | 180 | 61 | 108 | 105 | 100 | 0.43 |
| | 240 | 62 | 107 | 105 | 99 | 0.40 |

INDUSTRIAL APPLICABILITY

The hollow fiber membrane for blood purification of the invention, being constituted by the above, has good selectivity, as well as can reveal stable blood filterability and high clearance, without using any expansive materials such as poly(vinyl pyrrolidone). Thus, it can be suitably applied to blood dialysis, blood filtration etc. Moreover, since the blood purifier of the invention uses the above-mentioned hollow fiber membrane for blood purification as a treating membrane, it can be suitably applied to a hemodialyzer, a filter for hemodiafiltration, a hemofilter and the like.

We claim:

1. A hollow fiber membrane for blood purification comprising a polysulfone resin, an inner surface, an outer surface and inside, wherein there are slit-shaped micropores having an average width of 0.02 to 0.15 μm on the inner surface thereof;

there are micropores having an average pore size of 0.1 to 1 μm on the outer surface thereof;

the inside thereof has a sponge-like structure;

there are no large voids having a diameter of more than 10 μm on the inner and outer surface thereof and inside the membrane;

water permeability of the membrane is 400 to 2.500 ml/m$^2$·hr·mmHg; and a permeation ratio of the membrane for the total proteins is 1% or less.

2. The hollow fiber membrane for blood purification according to claim 1, wherein there are slit-shaped micropores having an average width of 0.04 to 0.1 μm on the inner surface thereof.

3. The hollow fiber membrane for blood purification according to claim 1, wherein the micropores on the outer surface of the membrane have an average pore size of 0.15 to 0.8 μm.

4. The hollow fiber membrane for blood purification according to claim 1, wherein water permeability thereof is 500 to 1,800 ml/m$^2$·hr·mmHg.

5. The hollow fiber membrane for blood purification according to claim 1, wherein the hollow fiber membrane for blood purification has an unsymmetrical structure, which has a fine active layer comprising aggregate of coagulated particles, on the inner surface;

a permeation ratio thereof for lysozyme is 30 to 70%; and a permeation ratio thereof for albumin is 8 to 20%.

6. The hollow fiber membrane for blood purification according to claim 5, wherein an average diameter of the coagulated particles is 0.1 to 0.7 μm.

7. The hollow fiber membrane for blood purification according to claim 5, wherein the permeation ratio thereof for lysozyme is 40 to 65%.

8. The hollow fiber membrane for blood purification according to claim 5, wherein the permeation ratio thereof for albumin is 9 to 18%.

9. The hollow fiber membrane for blood purification according to claim 2, wherein the micropores on the outer surface have an average pore size of 0.15 to 0.8 μm.

10. The hollow fiber membrane for blood purification according to claim 2, wherein water permeability thereof is 500 to 1,800 ml/m$^2$·hr·mmHg.

11. The hollow fiber membrane for blood purification according to claim 3, wherein water permeability thereof is 500 to 1,800 ml/m$^2$·hr·mmHg.

12. The hollow fiber membrane for blood purification according to claim 6, wherein the permeation ratio thereof for lysozyme is 40 to 65%.

13. The hollow fiber membrane for blood purification according to claim 6, wherein the permeation ratio thereof for albumin is 9 to 18%.

14. The hollow fiber membrane for blood purification according to claim 7, wherein the permeation ratio thereof for albumin is 9 to 18%.

15. A blood purifier comprising a cylindrical housing wherein the cylindrical housing comprises a blood inlet, a blood outlet, a dialysate solution inlet and a dialysate solution outlet and wherein the blood purifier further comprises a hollow fiber membrane located on the cylindrical housing, and wherein the hollow filter membrane comprises a polysulfone resin, an inner surface, an outer surface and inside, wherein there are slit-shaped micropores having an average width of 0.02 to 0.15 μm on the inner surface thereof;

there are micropores having an average pore size of 0.1 to 1 μm on the outer surface thereof;

the inside thereof has a sponge-like structure;

there are no large voids having a diameter of more than 10 μm on the inner and outer surface thereof and inside the membrane;

water permeability of the membrane is 400 to 2,500 ml/m$^2$·hr·mmHg; and a permeation ratio of the membrane for the total proteins is 1% or less.

16. The blood purifier of claim 15 wherein the slit-shaped micropores have an average width of 0.04 to 0.1 μm on the inner surface of the membrane.

17. The blood purifier of claim 15 wherein the micropores on the outer surface of the membrane have an average pore size of 0.15 to 0.8 μm.

18. The blood purifier of claim 15 wherein the water permeability is 500 to 1,800 ml/m$^2$·hr·mmHg.

19. The blood purifier of claim 15 wherein the membrane has an unsymmetrical structure, which comprises a fine active layer comprising aggregate of coagulated particles, on the inner surface;

a permeation ratio thereof for lysozyme is 30 to 70%; and a permeation ratio thereof for albumin is 8 to 20%.

20. The blood purifier according to claim 19, wherein an average diameter of the coagulated particles is 0.1 to 0.7 μm.

21. The blood purifier according to claim 19, wherein the permeation ratio thereof for lysozymiie is 40 to 65%.

22. The blood purifier according to claim 19, wherein the permeation ratio thereof for albumin is 9 to 18%.

23. A blood purifier comprising a cylindrical housing wherein the cylindrical housing comprises a blood inlet, a blood outlet, and a filtrate outlet and wherein the purifier further comprises a hollow fiber membrane located in the cylindrical housing and wherein the hollow fiber membrane comprises a polysulfone resin, an inner surface, an outer surface and inside, wherein there are slit-shaped micropores having an average width of 0.02 to 0.15 μm on the inner surface thereof;

there are micropores having an average pore size of 0.1 to 1 μm on the outer surface thereof;

the inside thereof has a sponge-like structure;

there are no large voids having a diameter of more than 10 μm on the inner and outer surface thereof and inside the membrane;

water permeability of the membrane is 400 to 2,500 ml/m$^2$·hr·mmHg; and a permeation ratio of the membrane for the total proteins is 1% or less.

24. The blood purifier of claim 23 wherein the slit-shaped micropores have an average width of 0.04 to 0.1 μm on the inner surface of the membrane.

25. The blood purifier of claim 23 wherein the micropores on the outer surface of the membrane have an average pore size of 0.15 to 0.8 μm.

26. The blood purifier of claim 23 wherein the water permeability is 500 to 1,800 ml/m$^2$·hr·mmHg.

27. The blood purifier of claim 23 wherein the membrane has an unsymmetrical structure, which comprises a fine active layer comprising aggregate of coagulated particles, on the inner surface;

a permeation ratio thereof for lysozyme is 30 to 70%; and a permeation ratio thereof for albumin is 8 to 20%.

28. The blood purifier according to claim 27, wherein an average diameter of the coagulated particles is 0.1 to 0.7 μm.

29. The blood purifier according to claim 27, wherein the permeation ratio thereof for lysozyme is 40 to 65%.

30. The blood purifier according to claim 27, wherein the permeation ratio thereof for albumin is 9 to 18%.

* * * * *